United States Patent
Dietrich et al.

(10) Patent No.: US 6,978,512 B2
(45) Date of Patent: *Dec. 27, 2005

(54) WIPER BLADE FOR CLEANING VEHICLE WINDOWS

(75) Inventors: Jan Dietrich, Buehl (DE); Christian Wilms, Beringen (BE); Julius Mazurkiewicz, Diest (BE); Paul Criel, St. Truiden (BE); Peter De Block, Halen (BE); Peter Wijnants, Wezemaal (BE)

(73) Assignee: Robert Bosch GmbH, Stuttgart (DE)

( * ) Notice: Subject to any disclaimer, the term of this patent is extended or adjusted under 35 U.S.C. 154(b) by 173 days.

This patent is subject to a terminal disclaimer.

(21) Appl. No.: 10/031,828

(22) PCT Filed: Apr. 4, 2001

(86) PCT No.: PCT/DE01/01303

§ 371 (c)(1),
(2), (4) Date: May 8, 2002

(87) PCT Pub. No.: WO01/89891

PCT Pub. Date: Nov. 29, 2001

(65) Prior Publication Data

US 2002/0148064 A1 Oct. 17, 2002

(30) Foreign Application Priority Data

May 25, 2000 (DE) ................ 100 25 706

(51) Int. Cl.$^7$ ................................ B60S 1/38
(52) U.S. Cl. ............ 15/250.43; 15/250.451; 15/250.452; 15/250.48
(58) Field of Search ............ 15/250.43, 250.44, 15/250.451, 250.48, 250.452, 250.453, 250.454

(56) References Cited

U.S. PATENT DOCUMENTS 2,687,544 A * 8/1954 Scinta ............ 15/250.452

(Continued)

FOREIGN PATENT DOCUMENTS

DE 1028896 * 4/1958

(Continued)

*Primary Examiner*—Gary K. Graham
(74) *Attorney, Agent, or Firm*—Michael J. Striker (57) ABSTRACT

A wiper blade is proposed, which is for cleaning for windows, particularly of motor vehicles. The wiper blade (10) has an elongated, rubber-elastic wiper strip (14), which can be placed against the window (22) and is connected to an elongated, spring-elastic support element (12) so that their longitudinal axes are parallel, which support element (12) is directly connected to a device (16) for connecting the wiper blade to a driven wiper arm (18). The support element (12) has two band-like spring strips (28, 30), which are situated in a plane that is disposed in front of the window, essentially parallel to the window, and whose one, lower band surfaces (13) are oriented toward the window and whose adjacent, inner longitudinal edges (48), which are disposed spaced a distance (34) apart from each other, each protrude into a respective longitudinal groove (54, 56, or 106), which grooves are associated with each longitudinal edge and are open toward a respective longitudinal side of the wiper strip (14), and these two spring strips (36, 38) are connected to each other by at least two crosspieces (36, 38) disposed spaced apart from each other in the longitudinal direction. Manufacturing advantages for the wiper blade according to the invention are achieved if each crosspiece (36, 38) has a middle section (42) which extends spaced a distance (44) apart from the upper band surfaces (11) of the spring strips (28, 30), producing bridge-like crosspieces, where the distance (34) between the two longitudinal strips (28, 30) is less than the bridge width (46).

15 Claims, 4 Drawing Sheets

U.S. PATENT DOCUMENTS

| | | | | |
|---|---|---|---|---|
| 2,983,945 A | * | 5/1961 | De Pew | 15/250.452 |
| 3,084,372 A | * | 4/1963 | Krohm | 15/250.48 |
| 3,116,507 A | * | 1/1964 | Scinta | 15/250.451 |
| 3,626,544 A | | 12/1971 | Lopez | |
| 3,636,583 A | | 1/1972 | Rosen | |
| 3,958,295 A | * | 5/1976 | Green et al. | 15/250.39 |
| 5,493,750 A | | 2/1996 | Bollen et al. | |
| 6,192,546 B1 | * | 2/2001 | Kotlarski | 15/250.43 |

FOREIGN PATENT DOCUMENTS

| | | | |
|---|---|---|---|
| DE | 1 505 357 | | 5/1969 |
| DE | 296 11 722 U1 | | 12/1997 |
| DE | 196 27 114 A | | 1/1998 |
| DE | 196 27 115 A | | 1/1998 |
| DE | 198 02 451 A1 | | 7/1999 |
| EP | 0 624 133 B1 | | 10/1995 |
| GB | 1 222 648 A | | 2/1971 |
| GB | 1 269 993 A | | 4/1972 |
| GB | 2036547 | * | 7/1980 |
| GB | 2 336 293 A | | 10/1999 |
| WO | 98/50261 | * | 11/1998 |
| WO | 99/02383 | | 1/1999 |

* cited by examiner

WIPER BLADE FOR CLEANING VEHICLE WINDOWS

BACKGROUND OF THE INVENTION

In common wiper blades for motor vehicles, the purpose of the support element is to assure as uniform as possible a distribution of the wiper blade pressure against the window, which pressure is exerted by a wiper arm connected to the wiper blade, over the entire wiping field wiped by the wiper blade. Through an appropriate curvature of the unloaded support element—i.e. when the wiper blade is not resting against the window—the ends of the wiper strip, which is placed completely against the window during the wiping operation of the wiper blade, are loaded toward the window by the support element, which is under tension in this state, even though the curvature radii of spherically curved vehicle windows change with each wiper blade position. The curvature of the wiper blade must therefore be somewhat sharper than the sharpest curvature measured within the wiping field on the window to be wiped. The support element consequently replaces the complex support bracket structure with two spring strips disposed in the wiper strip, as is the practice in conventional wiper blades (DE-OS 15 05 357).

In a known wiper blade (German Utility Model 29611722.6), the two spring strips are of one piece and are connected by means of crosspieces disposed at both of their ends. Since these crosspieces are disposed in the plane of the spring strips, the slot, which is disposed between the opposing longitudinal edges and is enclosed by the spring strips and the crosspieces, must open outward in its one end section so that is possible to property install the wiper strip in the slot. This installation opening, though, can produce disadvantageous changes in the spring properties of the support element with regard to the desired wiping results. In addition, manually inserting the wiper strip into the slot through this opening is cost-intensive.

SUMMARY OF THE INVENTION

In the wiper blade according to the invention, with the characterizing features of claim 1, it is possible, starting from one end of the support element, to insert the wiper strip in a rectilinear fashion between the two opposing longitudinal edges of the spring strip, where their inner, free edge strips protrude into the longitudinal grooves of the wiper strip. This simple installation movement can be easily executed by an automated installation machine, which achieves a considerable cost reduction. In addition, the disadvantageous installation opening of the slot can be eliminated because the bridge-like crosspieces permit the rectilinear installation motion of the wiper strip from one end of the support element.

Embodying the crosspieces as separate components that are attached to the spring strips achieves advantages in the production of the wiper blade.

For the connection between the spring strips and the crosspieces, it is useful if the crosspieces are attached to the upper band surfaces of the two spring strips.

A stable, durable connection between the spring strips and the crosspieces is achieved by welding together these separate components.

In order for the wiper blade or its wiper strip to be able to adapt in a trouble-free manner to the respective window curvature during wiper operation, it has turned out to be advantageous if the length of the spring strips is greater than the length of the wiper strip because then, through appropriate embodiments, a certain, advantageous longitudinal mobility of the wiper strip in relation to the support element can be assured.

A stable, low-torsion support element is produced if at least one crosspiece is disposed at each end section of the two associated spring strips. Depending on the length of the wiper blade, however, it is also quite conceivable to connect the two spring strips to each other by means of additional bridge-like crosspieces. In short wiper blades, it has turn out that placing a single crosspiece at each end section of the support element is sufficient to achieve a stable, torsion-free wiper blade.

An additional stabilization of the support element is achieved if a crosspiece disposed in the central region of the two associated spring strips is embodied as part of a connecting device for connecting the wiper blade to the wiper arm.

In a modification of the invention, at least one of the two crosspieces, which is respectively disposed at one of the end sections of the spring strips, has a stop, which is connected to its middle section and partially covers the end of the wiper strip adjacent to it. This prevents the wiper strip from creeping out of the support element in the longitudinal direction of the wiper blade.

When a crosspiece, which is provided with a stop, is respectively disposed at each of the two ends of the support element, the distance between the two stops is greater than the length of the wiper strip in order to assure a favorable adaptation of the wiper strip to the respective window curvature.

In order to reduce the danger of injury when manipulating the wiper, each crosspiece disposed at the end sections of the two spring strips is provided with a covering cap that is preferably made of plastic.

Other advantages during the wiping operation of the wiper according to the invention ensue from the fact that the thickness of a wall or intermediary strip between the two longitudinal grooves in the wiper strip is less than the distance between the adjacent longitudinal edges of the two associated spring strips. The longitudinal play of the wiper strip in the support element consequently produces a "free-floating", tension-free wiper strip that can continuously adapt to the window profile during wiper operation without being impaired by a clamped connection.

A particularly advantageous modification of the wiper blade is achieved if a wiper strip, which has a uniform cross section over its longitudinal span, has a strip-like wiper lip, which can be placed against the window and which, by means of a narrow intermediary strip that is formed by groove-like constrictions on opposite sides, is connected to a covering strip secured to the support element, and each of the two adjacent, inner longitudinal edges of the spring strips is disposed in one of the two groove-like constrictions of the wiper strip. This reduces the height of the wiper blade considerably. Because the width of the constriction groove is greater than the thickness of the spring strips in a partial region, the wiper lip can always tilt into the required drag position during wiper operation.

In this connection, it is particularly advantageous if the lateral defining surfaces of the groove-like constrictions diverge from the intermediary strip to the longitudinal sides of the wiper strip. With a corresponding matching, the spring strips can thus guide the wiper strip at the intermediary strip and simultaneously allow the wiper lip to execute its required tilting motion into the drag position.

One modification of the invention provides that one of the lateral defining surfaces of the groove-like constrictions has a spherical curvature, viewed in cross section. This permits a favorable and quiet rolling motion of this side wall against the band surface of the relevant spring strip oriented toward it.

This advantage can be further improved if both lateral defining surfaces of the groove-like constrictions have a spherical curvature, viewed in cross section.

According to one embodiment of the invention, the wiper lip has a completely enclosed longitudinal conduit in order to encourage an optimal contact of the wiper strip against the preferably spherically curved window to be wiped.

So that it is no longer necessary to carry out particular steps to fasten a connecting device for a wiper arm that moves the wiper blade, each of the two spring strips, at least with a central edge strip, protrudes from its groove-like constriction so that the connecting device can be fastened to the free edge strips.

Other advantageous modifications and embodiments of the invention are disclosed in the following description of exemplary embodiments shown in the accompanying drawings.

DETAILED DESCRIPTION OF THE PREFERRED EMBODIMENTS

Figures 1, 2:
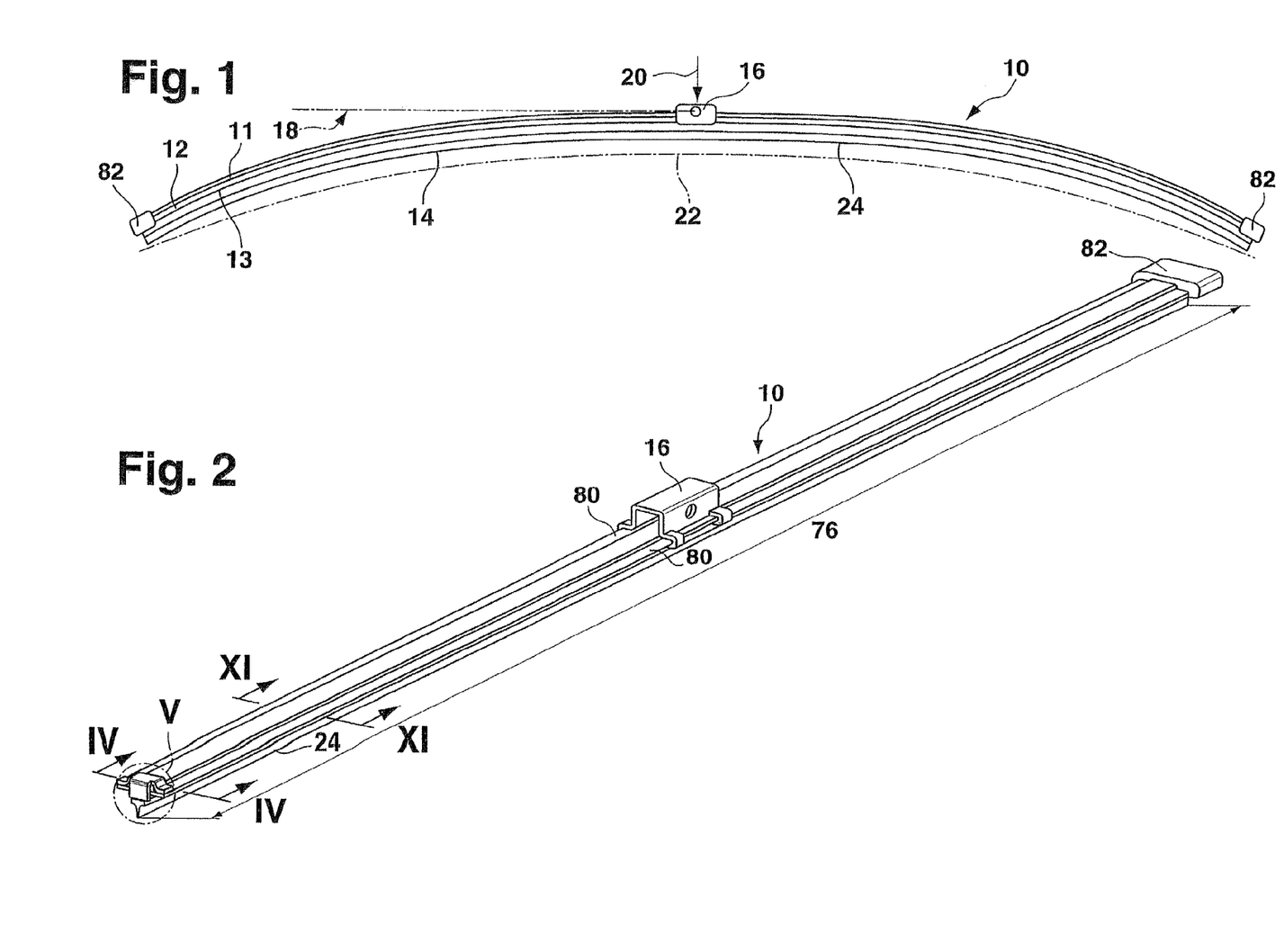
FIG. 1 is a side view of a wiper blade according to the invention.
FIG. 2 is a prolate depiction of the wiper blade from FIG. 1, in a perspective representation drawn to scale.

A wiper blade 10 indicated in FIGS. 1 and 2 has a band-like, elongated, spring-elastic support element 12, against whose underside 13 an elongated, rubber-elastic wiper strip 14 is disposed so that their longitudinal axes are parallel. On the top side 11 of the support element 14, which is also referred to as a spring bar, the center section of the support element is provided with the wiper blade part 16 of a connecting device, with the aid of which the wiper blade 10 can be detachably connected in an articulating fashion to a driven wiper arm 18 indicated with a dot-and-dash line in FIG. 1. To that end, the free end of the wiper arm 18 is provided with the wiper arm part of the connecting device. The wiper arm 18 is loaded in the direction of the arrow 20 toward the window to be wiped, for example the windshield of a motor vehicle, whose surface to be wiped is indicated with a dot-and-dash line 22 in FIG. 1. Since the line 22 is intended to represent the sharpest curvature of the window surface, it is clear that the curvature of the wiper blade 10, which is not yet under tension and rests with both of its ends against the window, is sharper than the maximal window curvature (FIG. 1). Due to the pressure (arrow 20), the wiper blade 10 places its wiper lip 24 over its entire length against the window surface 22. This causes a tension to be built up in the spring-elastic support element 12, which is made of metal for example, which tension assures a uniform contact of the wiper strip 14 and the wiper lip 24 over its entire length against the window and assures a uniform distribution of the pressure.

Figures 3, 4:
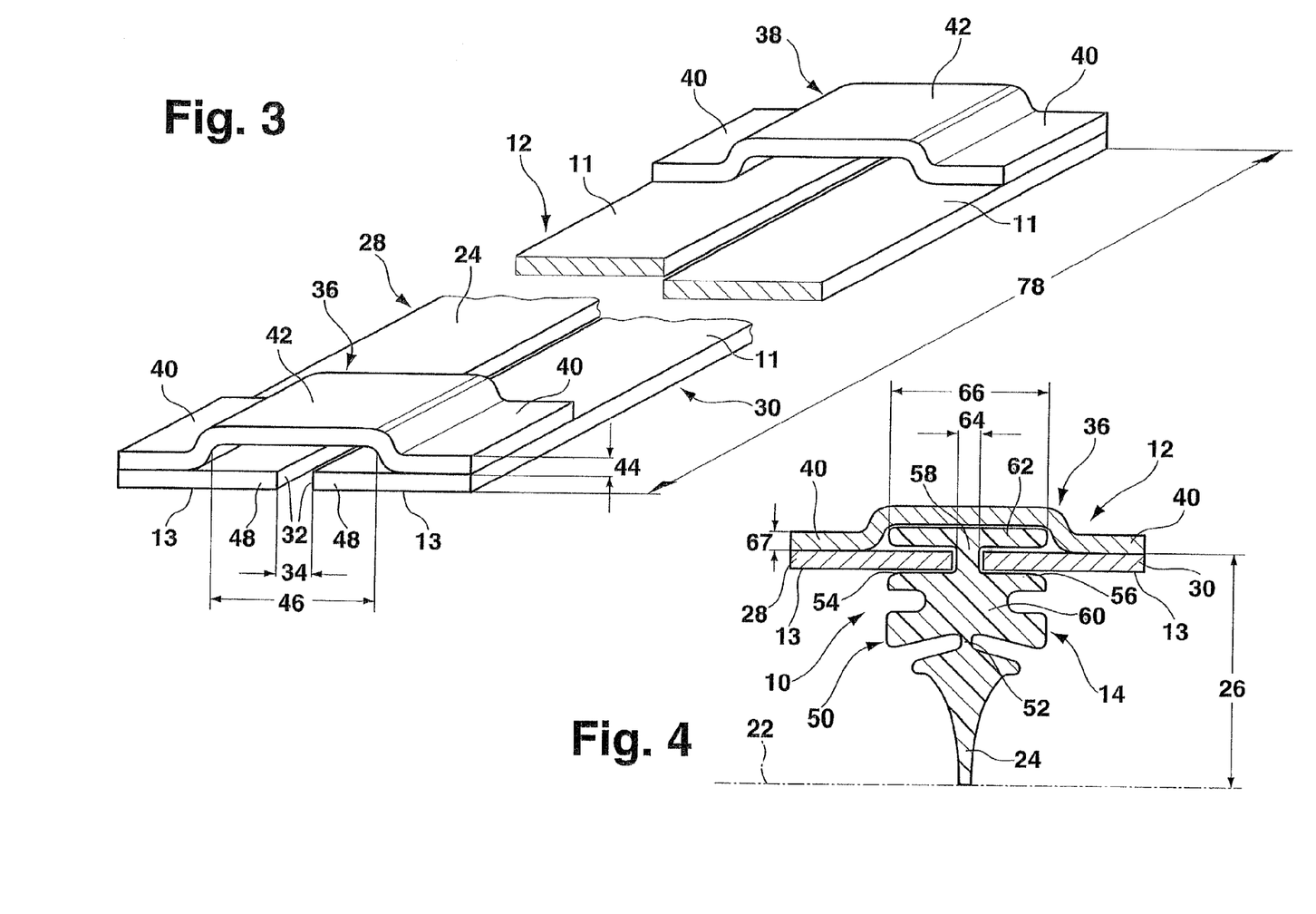
FIG. 3 shows a foreshortened, enlarged, prolate, perspective depiction of a support element associated with the wiper blade according to the invention.
FIG. 4 shows an enlargement of the sectional plane of a section along the line IV—IV in FIG. 2.

A first embodiment of the wiper blade 10 will be explained in detail below in conjunction with FIGS. 3 to 5. FIG. 4 shows that the support element 12 of the wiper blade 10 is spaced a distance 26 apart from the window 22 to be wiped. Its position is designed so that its band surfaces 11 and 13 are disposed in a plane extending essentially parallel to the window surface 22 to be wiped. The particularly advantageous design of the support element 12 is shown particularly in FIGS. 3 and 4. It has two band-like spring strips 28 and 30 disposed in a common plane, which are aligned parallel to each other. The opposing, inner longitudinal edges 32 are spaced a distance 34 apart from each other. The spring strips 28, 30 are connected to each other at each of the two ends by means of a bridge-like crosspiece 36 and 38, for example by means of welds. In this instance, each bridge-like crosspiece rests with its end sections 40 against the top side 11 of the support element 12 or its spring strips 28, 30. Each of the two crosspieces 36 and 28 has a middle section 42 which is spaced a distance 44 apart from the upper band surface 11 of the spring strips, thereby forming the basis of its bridge-like design. Since the longitudinal span 46 of the middle sections 42 is greater than the distance 34 between the opposing inner longitudinal edges 32, the two spring strips 28 and 30 extend with inner edge strips 48 into the region of the middle sections 42, where the edge strips 48 are disposed underneath the middle sections 42, spaced apart from them by a distance 44. In addition to the above-mentioned purposes of the support element 12 with regard to contact force distribution, it should also assure a regulation-compliant, tension-free guidance of the wiper strip 14 during wiper operation. This also assures a quiet wiper operation.

The wiper strip 14 of this first embodiment has a cross section, which will be clarified in conjunction with FIG. 4. It has a top strip 50 that is connected to the wiper lip 24, which performs the actual wiping function, by means of a narrow intermediary strip 52. The disposition of the intermediary strip 52 permits the wiper lip 24 to tilt into a drag position that encourages the wiping function, which will be explained later. On its opposite longitudinal sides, the top strip 50 is provided with longitudinal grooves 54 and 56 that are open at the edges oriented toward these longitudinal sides. The longitudinal grooves 54 and 56 serve to receive the inner edge strips 48 of the spring strips 28 and 30. The depth of the longitudinal grooves 54 and 56 is selected so that a wall 58 remains between the two longitudinal grooves. The top strip 50 consequently has a main strip 60 and a covering strip 62, which are connected to each other by means of the wall 58. The thickness 64 of the wall 58 is less than the distance 34 between the inner longitudinal edges 32 of the spring strips 28, 30, i.e. less than the distance between their inner edge strips 48. The width of the two longitudinal grooves 54 and 56 in the top strip 50 is matched to the thickness of the spring strips 28, 30 and/or their inner edge strips 48 so that a tension-free securing of the wiper strip to the support element 12 is assured when the wiper strip according to FIG. 4 is put together with the support element 12 according to FIG. 3. Since the width 66 of the covering strip 62 is also somewhat less than the longitudinal span 46 of the middle section 42, also referred to as the bridge width, and its thickness 67 is less than the distance 44 between the middle section 42 and the top sides 11 of the spring strips 28, 30, the wiper strip 14, which has a uniform cross section over its entire longitudinal span, can easily be inserted longitudinally into the support element 12 and thus connected to it.

Figures 5, 7:
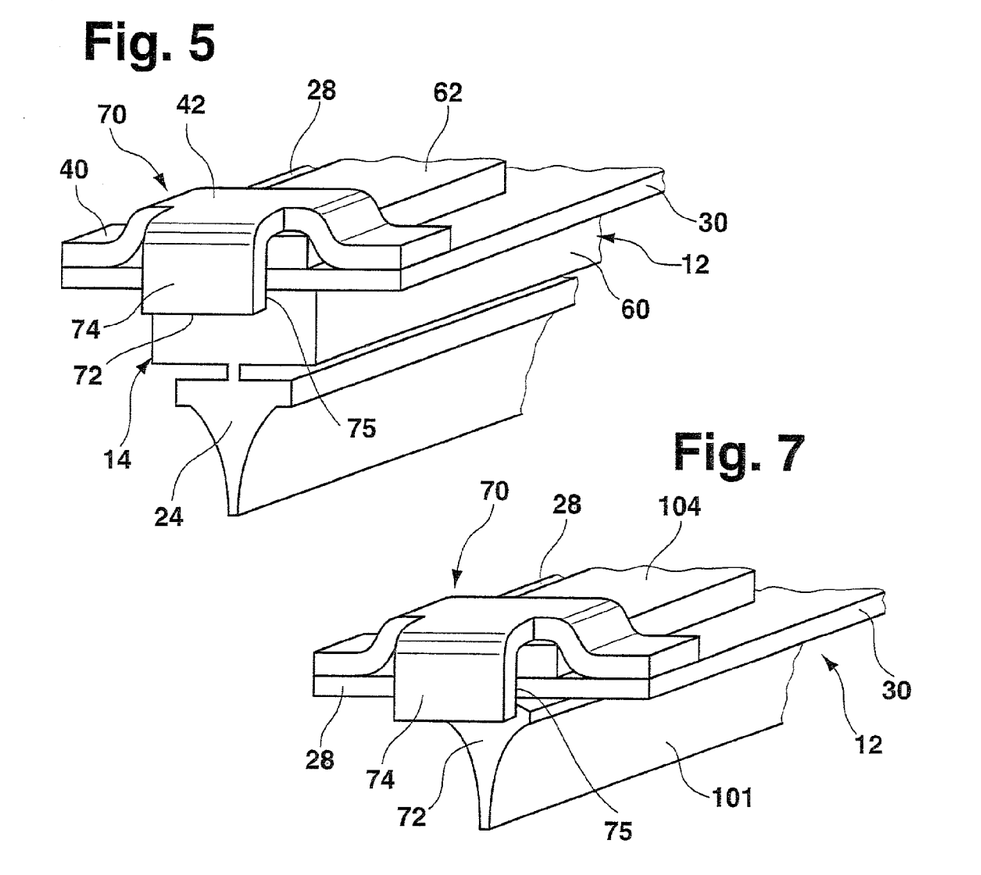
FIG. 5 shows an enlargement of a detail labeled V in FIG. 2.
FIG. 7 shows the wiper blade from FIG. 6 in a detail that corresponds to FIG. 5.

FIG. 5 shows another exceptional feature of the wiper blade according to the invention. This figure shows that on its side oriented toward the wiper blade end, in its middle section, the crosspiece 70 disposed at one end of the support element is provided with a stop 74, which is connected to it and which at least partially covers the end face 72 adjacent to it. The stop 74 is constituted by a tab-like projection from the middle section 42, which projection is bent at right angles. If each of the two wiper blade ends or each of the two support element ends is provided with a crosspiece 70 according to FIG. 5, care must be taken that the distance between the opposing inner wills 75 of the stop tabs 74 is slightly greater than the length 76 of the wiper strip 14 (FIG. 2). This can also be achieved, for example, by the length 78 of the support element 12 being slightly greater than the length 76 of the wiper strip 14. The placement of the stops 74 at both ends thus constitutes an effective securing means for preventing the wiper strip 14 from creeping in the longitudinal direction out of its support element 12 during wiper operation. Naturally, in such a case, at least one of the two stop tabs 74 is bent at right angles only after the wiper strip 14 is inserted into the support element 12.

The wiper arm part 16 of the connecting device, which is for the wiper arm and is disposed in the middle section of the wiper blade 10, engages around the outer edge strips 80 of the spring strips 28, 30 or the support element 12 protruding from the longitudinal grooves 54 and 56. The connection between the part 16 and the support element 12 can be produced by means of positive and/or frictional engagement. With a corresponding length of the wiper blade, it can also be useful to provide additional corresponding crosspieces between the two crosspieces 36 and 38 disposed at the ends. In order to prevent injury when the wiper blade is being manipulated, particularly by the end user, a covering cap 82 that is preferably made of plastic is disposed on the two spring strips 28, 30 or the crosspieces 36, 38 at the end, preferably connected to them in detent fashion, preferably connected to them in detent fashion (FIGS. 1 and 2).

Figure 6:
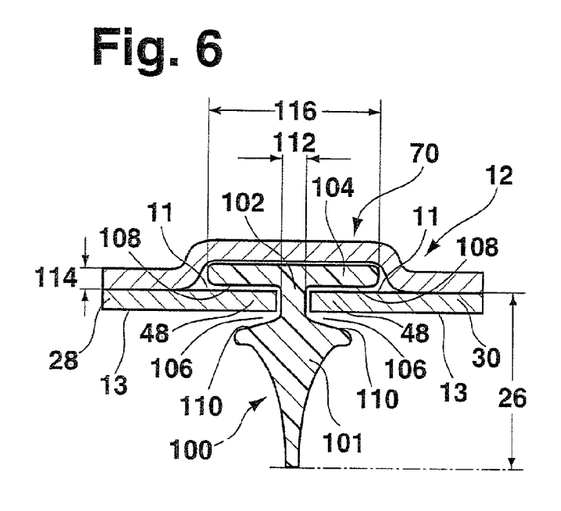
FIG. 6 shows the sectional plane of a section according to FIG. 4 through another embodiment of the wiper blade according to the invention.
Figure 8:
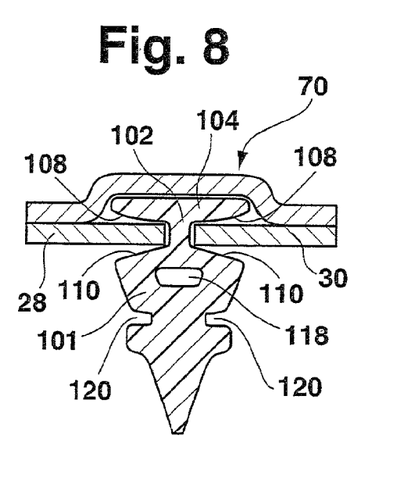
FIG. 8 shows the sectional plane of a section according to FIGS. 4 and 6 through another embodiment of the wiper blade according to the invention.

FIGS. 6 to 8 show additional embodiments of the wiper blade according to the invention.

The support elements of these embodiments fully correspond to the support elements 12 from FIGS. 3 to 5 explained above so that the reference numerals used for them in these figures can be adopted directly. The embodiment of the wiper strip 100 in this embodiment, though, differs fundamentally from the design of the wiper strip 14 in the embodiment described above. As FIG. 6 in particular shows, the wiper strip 100 has only one wiper lip 101, which is of one piece with a covering strip 104 and is connected to it by means of an intermediary strip 102. The main strip 60 in the exemplary embodiment described above in conjunction with FIGS. 4 and 5 is consequently eliminated. The inner edge strips 48 of the spring strips 28 and 30 rest in groove-like constrictions 106 of the wiper strip 100, which are required to produce the narrow intermediary strip 102. Consequently, the lateral defining surface 108 of the constriction 106 embodied on the covering strip 104 is oriented toward the upper band surface 11 of the support element 12. The other lateral defining surface 110 of the groove-like constriction 106 is consequently disposed directly opposite from the lower band surface 13 of the support element 12. It is consequently clear that each of the two inner longitudinal edges 32 of the two spring strips 28, 30 or of the support element 12 is disposed in one of the two groove-like constrictions 106 of the wiper strip 100. In addition, FIG. 6 particularly shows that the two lateral defining surfaces 110 of the constrictions 106 are embodied spherically and are disposed so that the width dimension of the groove-like constrictions 106 is wider than the thickness of the spring strips 28, 30, at least over an outer partial region. It is therefore possible for the wiper lip 101 to tilt over into the desired, advantageous drag position during wiper operation. In this embodiment of the wiper blade according to the invention as well, the width 112 of the intermediary strip 102 is matched to the distance 34 between the opposing inner longitudinal edges 32 of the spring strips 28, 30 in such a way that an air gap remains between the intermediary strip and the spring strips. Here, too, the thickness 114 of the covering strip 104 is also slightly less than the distance 44 between the middle section 42 of the crosspiece 36 and the inner edge strip 48. Also, the width 116 of the covering strip 104 is slightly less than the longitudinal span 46 of the middle section 42 of the bridge-like crosspieces 36. As a result, it is possible to insert the wiper strip 100, which has a uniform cross section over its entire length, without trouble into the support element 12 over its longitudinal span so that the installation position shown in FIG. 6 is achieved. In this embodiment as well, the plane in which the support element 12 extends is spaced a distance 26 apart from the surface 22 of the window 22 to be wiped.

As described above in conjunction with FIG. 5, in this embodiment of the wiper blade according to the invention as well, each of the two bridge-like crosspieces 70, at its outer ends in the longitudinal span of the wiper blade, can be provided with a stop 74, which is bent at right angles so that after the wiper strip 14 is inserted into the support element 12 and the stop tabs 74 are bent at right angles, the wiper strip 100 is reliably assured of being longitudinally secured in the support element 12. It is clear that in this embodiment as well, the distance between the opposing inner walls 75 of the stop tabs 74 must be slightly greater than the length 76 of the wiper strip.

Another embodiment of the wiper blade according to the invention will be explained in conjunction with FIG. 8. The embodiment according to FIG. 8 corresponds in its basic design to the design of the embodiment described in conjunction with FIG. 6. In contrast to the embodiment according to FIG. 6, though, in this embodiment, not only the lateral defining surfaces 110 of the groove-like constrictions 106, but also the other lateral defining surfaces 108 embodied on the covering strip 104 are embodied spherically. The embodiment according to FIG. 8 also differs from the embodiment according to FIG. 6 by means of a continuous, completely closed longitudinal conduit 118 disposed in the wiper lip 101. The disposition of the longitudinal conduit 118 in the wiper lip can be used, by itself or in connection with additional longitudinal grooves, to produce a smooth, quiet tilting behavior of the wiper lip during wiper operation. In addition, its disposition is not absolutely required in connection with the spherical embodiment of the defining surfaces 108, 110.

As is clear from FIGS. 2 and 3, the width of the support element 12 is the same over its entire longitudinal span. However, it is also conceivable for the support element to taper toward the end sections of the wiper blade. In order for the part 16 to be fastened to the wiper blade, it is sufficient if each spring strip 28, 30, at least with a central, outer edge strip 80, protrudes from its groove-like constriction so that the part 16 of the connecting device can be fastened to this edge strip 80. Instead of a support element 12 according to FIG. 3, it is also conceivable for the two spring strips to be embodied as separate components and to be disposed in the groove-like constrictions of the wiper strip. The securing, in particular of the distance 34, can then be performed by other components that are not shown in detail.

Figure 9:
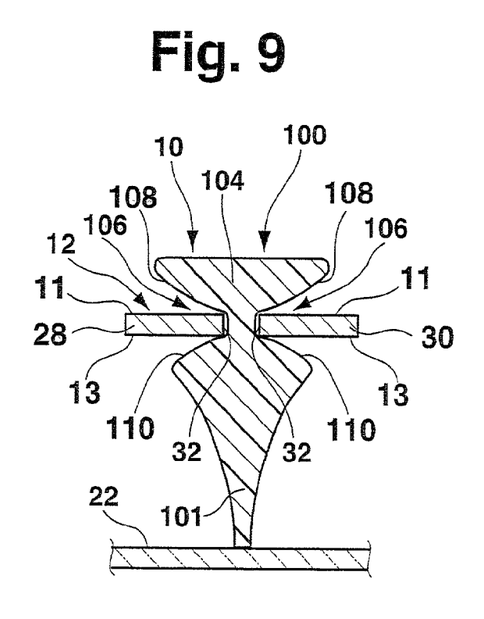
FIG. 9 is a schematic representation of the sectional plane of a section along the line IX—IX in FIG. 2 through a wiper blade according to the invention, in an enlarged depiction, in which the wiper blade is placed against the window surface to be wiped.
Figure 10:
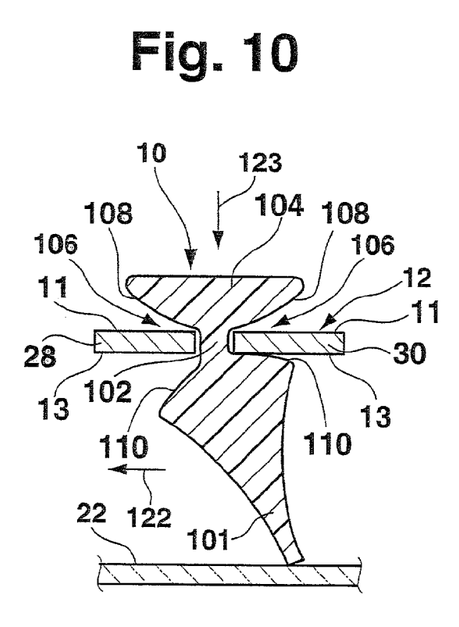
FIG. 10 shows the wiper blade from FIG. 9 during wiper operation in one wiping direction.
Figure 11:
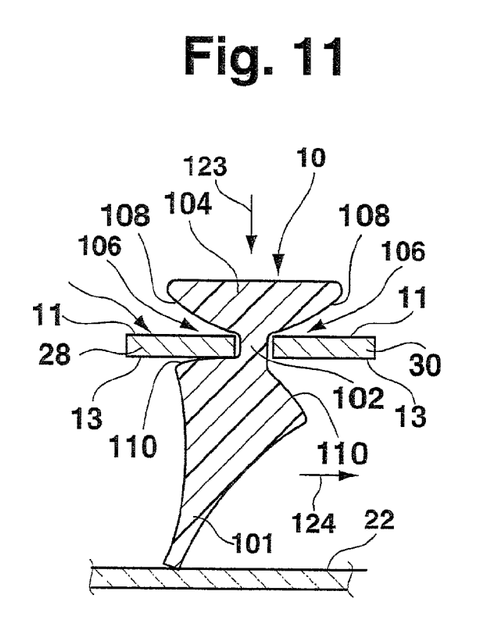
FIG. 11 shows the wiper blade from FIG. 9 during wiper operation in the other wiping direction.

FIGS. 9 to 11 show schematic sectional depictions of the wiper blade according to FIGS. 6 and 7, cut along the line IX—IX in FIG. 2; in FIG. 9, the wiper blade 10 is merely placed with its wiper lip 101 against the window surface 22 to be wiped and FIG. 9 shows the circular curved surfaces 108, 110 of the groove-like constrictions in cross-section. The wiper strip 100 is secured with play between the inner longitudinal edges 32 of the two spring strips 28, 30 (also see FIGS. 3 and 4). Since the length 76 of the wiper strip 100 is also slightly less than the length 78 of the support element 12 or is slightly less than the distance between the opposing inner walls 75 of the stops 74 at the two ends of the support element 12, this produces a so-called "free-floating", tension-free, but operationally reliable securing of the wiper strip 100 in the support element 12.

If during wiper operation, the wiper blade 10, loaded by the pressure (arrow 20 in FIG. 1), is then moved across the window 22 in the direction of the arrow 122 in FIG. 10, then the wiper lip 101 tilts in the vicinity of the intermediary strip 102 into an advantageous drag position in which the support element 12 comes slightly closer to the window (arrow 123). The tilting motion is limited by the fact that the lateral defining surface 110 of the one groove-like constriction 106 is supported against the underside 13 of the one spring strip 30. When the wiper blade 10 has reached its reversal position and is moved by the wiper arm 18 in the opposite direction (arrow 124 in FIG. 11), the wiper lip 101 tilts through an intermediary position shown in FIG. 9, into its other drag position (FIG. 11), in which the wiper lip 101 is supported with the lateral defining surface 110 of the other groove-like constriction 106 against the underside 13 of the other spring strip 28.

When the drag positions of the wiper lip 101, close to their reversal positions—due to the usually spherical curvature of the windshield 22—approaches the window, the spherically embodied defining surfaces 110 roll silently against the undersides 13 of the spring strips 28, 30. Correspondingly, the other spherical defining surfaces 108 of the groove-like constrictions 106 can, if necessary, also roll against the top sides 11 of the spring strips 28 and 30.

What is claimed is:

1. A wiper blade (10) for windows of motor vehicles, having en elongated, rubber-elastic wiper strip (14), which can be placed against the window (22) and is connected to an elongated, spring-elastic support element (12) so that their longitudinal axes are parallel, which support element (12) is directly connected to a device for connecting the wiper blade to a driven wirer arm (18), wherein the support element (12) has two band-like spring strips (28, 30), which are situated in a plane that is disposed in front of the window, essentially parallel to the window, and whose, lower band surfaces (13) are oriented toward the window and whose adjacent, inner longitudinal edges (48), which are disposed spaced a distance (34) apart from each other, each protrude into a respective longitudinal groove (54, 56, or 106), which grooves are associated with each longitudinal edge and are each open toward a respective longitudinal side of the wiper strip (14), and these two spring strips (36, 38) are connected to each other by at least two crosspieces (36, 38) disposed spaced apart from each other in the longitudinal direction, wherein each crosspiece (36, 38) has a middle section (42) which extends spaced a distance (44) apart from the upper band surfaces (11) of the spring strips (28, 30), producing bridge-like crosspieces (36, 38) defining a bridgewidth, where the distance (34) between the two longitudinal strips (28, 30) is less than the bridge width (46),
   wherein the crosspieces (36, 38) are attached to the upper band surfaces (11) of the two spring strips (28, 30),
   wherein the crosspieces (36, 38) are welded to the two spring strips (28, 30), so that the wiper strip from an end of the support element is insertable linearly between the longitudinal edges of the spring strips facing one another, and
   wherein each crosspiece (36, 38) disposed at the end sections of the two spring strips (28, 30) is provided with a covering cap (82) preferably made of plastic.

2. The wiper blade according to claim 1, wherein the crosspieces (36, 38) are embodied as separate components and are affixed to the two spring strips (28, 30).

3. The wiper blade according to claim 1, wherein the length (78) of the spring strips is greater than the length (76) of the wiper strip (14).

4. The wiper blade according to claim 1, wherein at least one crosspiece (36, 38) is disposed at each end section of the two associated spring strips (28, 30).

5. The wiper blade according to claim 4, wherein a crosspiece disposed in the middle region of the two associated spring strips (28, 30) is embodied as part (16) of the connecting device for connecting the wiper blade (10) to the wiper arm (18).

6. The wiper blade according to claim 4, wherein at least one of the two crosspieces (70) disposed at one of the respective end sections of the spring strips (28, 30) is provided with a stop (74), which is connected to its middle section (42) and partially covers the adjacent end (72) of the wiper strip.

7. The wiper blade according to claim 6, wherein the both of the crosspieces (36, 38) disposed at the ends of the support element (12) are provided with a stop (74).

8. The wiper blade according to claim 1, wherein the thickness (64) of a wall (58) provided between the two longitudinal grooves (54, 56) in the wiper strip (14) is smaller than the distance (34) between the adjacent longitudinal edges (32) of the two associated spring strips (28, 30).

9. The wiper blade according to claim 1, wherein the wiper strip (100), which has a uniform cross section over its longitudinal span, has a strip-like wiper lip (101), which can be placed against the window and which, by means of a narrow intermediary strip (102) that is formed by groove-like constrictions (106) on opposite sides, is connected to a covering strip (104) secured to the support element (12), and in that each of the two adjacent inner longitudinal edges (32) of the spring strips (28, 30) is disposed in one of the two groove-like constrictions (106) of the wiper strip (100).

10. The wiper blade according to claim 9, wherein the lateral defining surfaces (108, 110) of the groove-like constrictions (106) diverge from the intermediary strip (102) to the longitudinal sides of the wiper strip.

11. The wiper blade according to claim 10, wherein one lateral defining surface (110) of the groove-like constrictions (106) has a circular curvature, viewed in cross section.

12. The wiper blade according to claim 9, wherein the wiper lip (101) is provided with a completely closed longitudinal conduit (118).

13. The wiper blade according to claim 9, wherein each spring strip (28, 30), at least with a central edge strip, protrudes from its groove-like constriction (106).

14. A wiper blade (10) for windows of motor vehicles, having an elongated, rubber-elastic wiper strip (14), which can be placed against the window (22) and is connected to an elongated, spring-elastic support element (12) so that their longitudinal axes are parallel, which support element (12) is directly connected to a device for connecting the wiper blade to a driven wiper arm (18), wherein the support element (12) has two band-like spring strips (28, 30), which are situated in a plane that is disposed in front of the window, essentially parallel to the window, and whose, lower band surfaces (13) are oriented toward the window and whose adjacent, inner longitudinal edges (48), which are disposed spaced a distance (34) apart from each other, each protrude into a respective longitudinal groove (54, 56, or 106), which grooves are associated with each longitudinal edge and are each open toward a respective longitudinal side of the wiper strip (14), and these two spring strips (36, 38) are connected to each other by at least two crosspieces (36, 38) disposed spaced apart from each other in the longitudinal direction, wherein each crosspiece (36, 38) has a middle section (42) which extends spaced a distance (44) apart from the upper band surfaces (11) of the spring strips (28, 30), producing bridge-like crosspieces defining a bridge width, wherein the distance (34) between the two longitudinal strips (28, 30) is less than the bridge width (46), wherein the crosspieces (36, 38) are attached to the upper band surfaces (11) of the two spring strips (28, 30), wherein the crosspieces (36, 38) are welded to the two spring strips (28, 30), so that the wiper strip from an end of the support element is insertable linearly between the longitudinal edges of the spring strips facing one another, wherein the wiper strip (100), which has a uniform cross section over its longitudinal span, has a strip-like wiper lip (101), which can be placed against the window and which, by means of a narrow intermediary strip (102) that is formed by groove-like constrictions (106) on opposite sides, is connected to a covering strip (104) secured to the support element (12), and wherein each of the two adjacent inner longitudinal edges (32) of the spring strips (28, 30) is disposed in one of the two groove-like constrictions (106) of the wiper strip (100), wherein the lateral defining surfaces (108, 110) of the groove-like constrictions (106) diverge from the intermediary strip (102) to the longitudinal sides of the wiper strip, and wherein both lateral defining surfaces (108, 110) of the groove-like constrictions (106) have a circular curvature, viewed in cross section.

15. A wiper blade (10) for windows of motor vehicles, comprising:

an elongated, rubber-elastic wiper strip (14), which can be placed against the window (22) and is connected to an elongated, spring-elastic support element (12) so that their longitudinal axes are parallel, which support element (12) is directly connected to a device for connecting the wiper blade to a driven wiper arm (18), wherein the support element (12) has two band-like spring strips (28, 30), which are situated in a plane that is disposed in front of the window, essentially parallel to the window, and whose, lower band surfaces (13) are oriented toward the window and whose adjacent, inner longitudinal edges (48), which are disposed spaced a distance (34) apart from each other, each protrude into a respective longitudinal groove (54, 56, or 106), which grooves are associated with each longitudinal edge and are each open toward a respective longitudinal side of the wiper strip (14), and these two spring strips (36, 38) are connected to each other by at least two crosspieces (36, 38) disposed spaced apart from each other in the longitudinal direction, wherein each crosspiece (36, 38) has a middle section (42) which extends spaced a distance (44) apart from the upper band surfaces (11) of the spring strips (28, 30), producing bridge-like crosspieces (36, 38) defining a bridge with, where the distance (34) between the two longitudinal strips (28, 30) is less than the bridge width (46), wherein the wiper strip (100), which has a uniform cross section over its longitudinal span, has a strip-like wiper lip (101), which can be placed against the window and which, by means of a narrow intermediary strip (102) that is formed by groove-like constrictions (106) on opposite sides, is connected to a covering strip (104) secured to the support element (12), and in that each of the two adjacent inner longitudinal edges (32) of the spring strips (28, 30) is disposed in one of groove-like constrictions (106) of the wiper strip (100), wherein the lateral defining surfaces (108, 110) of the groove-like constrictions (106) diverge from the intermediary strip (102) to the longitudinal sides of the wiper strip and wherein both lateral defining surfaces (108, 110) of the groove-like constrictions (106) have a circular curvature, viewed in cross section.

* * * * *